(12) United States Patent
Amante et al.

(10) Patent No.: US 11,728,540 B2
(45) Date of Patent: Aug. 15, 2023

(54) DOUBLE SIDED BATTERY MOUNTING APPARATUS

(71) Applicant: Bell Textron Inc., Fort Worth, TX (US)

(72) Inventors: William A. Amante, Grapevine, TX (US); Steven Loveland, Fort Worth, TX (US); Jessica A. Revere, Haltom City, TX (US)

(73) Assignee: Textron Innovations Inc., Providence, RI (US)

( * ) Notice: Subject to any disclaimer, the term of this patent is extended or adjusted under 35 U.S.C. 154(b) by 227 days.

(21) Appl. No.: 17/172,366

(22) Filed: Feb. 10, 2021

(65) Prior Publication Data
US 2022/0255175 A1    Aug. 11, 2022

(51) Int. Cl.
| | |
|---|---|
| *H01M 10/6556* | (2014.01) |
| *H01M 50/244* | (2021.01) |
| *H01M 10/6554* | (2014.01) |
| *H01M 10/625* | (2014.01) |
| *H01M 10/613* | (2014.01) |
| *H01M 50/249* | (2021.01) |
| *B64D 29/04* | (2006.01) |
| *B64D 33/08* | (2006.01) |

(52) U.S. Cl.
CPC .......... *H01M 50/249* (2021.01); *B64D 29/04* (2013.01); *B64D 33/08* (2013.01); *H01M 10/613* (2015.04); *H01M 10/625* (2015.04); *H01M 10/6554* (2015.04); *H01M 10/6556* (2015.04); *H01M 50/244* (2021.01); *H01M 2220/20* (2013.01)

(58) Field of Classification Search
None
See application file for complete search history.

(56) References Cited

U.S. PATENT DOCUMENTS

| | | |
|---|---|---|
| 2005/0180104 A1 | 8/2005 | Olesen |
| 2006/0237166 A1 | 10/2006 | Otey |
| 2010/0243346 A1 | 9/2010 | Anderson |
| 2011/0189525 A1 | 8/2011 | Palanchon |
| 2012/0028099 A1 | 2/2012 | Aoki |
| 2012/0121946 A1* | 5/2012 | Eckstein ............. H01M 10/613 |
| | | 429/120 |
| 2012/0156543 A1* | 6/2012 | Cicero ............. H01M 10/0481 |
| | | 429/120 |
| 2013/0244077 A1 | 9/2013 | Palanchon |
| 2014/0305622 A1 | 10/2014 | Daubitzer |
| 2018/0304390 A1* | 10/2018 | Hirayama ............. B23K 35/28 |

(Continued)

FOREIGN PATENT DOCUMENTS

| | | |
|---|---|---|
| DE | 102015107170 | * 11/2016 |

*Primary Examiner* — Lisa S Park
(74) *Attorney, Agent, or Firm* — Frost Brown Todd LLP

(57) ABSTRACT

A battery assembly for an aircraft includes a cold plate having an upper planar member, a lower planar member, and at least one fluid channel positioned between the upper and lower planar members and configured to receive a cooling fluid. The battery assembly also includes an upper battery mounted to the upper planar member for transferring heat from the upper battery to the cooling fluid through the upper planar member. The battery assembly further includes a lower battery mounted to the lower planar member for transferring heat from the lower battery to the cooling fluid through the lower planar member.

12 Claims, 5 Drawing Sheets

(56) References Cited

U.S. PATENT DOCUMENTS

2019/0237827 A1* 8/2019 Ge ..................... F28F 13/06
2019/0252744 A1   8/2019 Zimmermann
2019/0319249 A1  10/2019 Barton et al.

* cited by examiner

DOUBLE SIDED BATTERY MOUNTING APPARATUS

TECHNICAL FIELD

The present disclosure is directed to directed to a battery mounting apparatus for an aircraft and, more particularly, to a double sided battery mounting apparatus for the aircraft.

BACKGROUND OF THE INVENTION

Conventionally powered rotorcraft, such as helicopters and tiltrotors, are driven by a combustion engine mechanically transmitting power to the rotors. In some rotorcraft, the rotor's mechanical drive system is replaced with direct drive electric motor systems. In hybrid rotorcraft designs, a combustion engine may drive a main rotor while a separate electric system is used to drive one or more anti-torque rotors. This approach can be used to improve rotorcraft propulsion systems, for example, to reduce noise, reduce weight, or to improve safety. Both electric and hybrid rotorcraft designs require multiple batteries to be stored on the rotorcraft. Typically, such batteries are stored in the fuselage of the rotorcraft. Due to the size and weight of each battery (e.g., greater than 300 pounds), this may undesirably increase the size of the fuselage, as well as the weight of the rotorcraft and the amount of drag experienced by the rotorcraft during flight operations.

BRIEF SUMMARY OF THE INVENTION

In a first aspect, the present disclosure is directed to a battery assembly for an aircraft. The battery assembly includes (a) a cold plate including: (i) an upper planar member, (ii) a lower planar member, and (iii) at least one fluid channel positioned between the upper and lower planar members and configured to receive a cooling fluid; (b) an upper battery mounted to the upper planar member for transferring heat from the upper battery to the cooling fluid through the upper planar member; and (c) a lower battery mounted to the lower planar member for transferring heat from the lower battery to the cooling fluid through the lower planar member. In some embodiments, one of the upper or lower planar members includes a main structural web. In other embodiments, the cold plate further includes a main structural web, wherein the upper and lower planar members include upper and lower enclosure panels operatively coupled to the main structural web. In this regard, the at least one fluid channel may include an upper fluid channel positioned between the main structural web and the upper enclosure panel, and a lower fluid channel positioned between the main structural web and the lower enclosure panel. For example, the upper and lower fluid channels may be fluidly isolated from each other.

In some embodiments, the cold plate further includes a plurality of stiffeners extending between the upper and lower planar members, wherein the plurality of stiffeners are spaced apart from each other to define respective fluid channel portions of the at least one fluid channel. In this regard, each of the stiffeners may include an aperture for providing fluid communication between adjacent fluid channel portions of the at least one fluid channel. In addition or alternatively, the cold plate may further include an attachment flange configured to couple to a pair of beams of the aircraft. In some embodiments, the upper battery has an upper battery weight, wherein the lower battery has a lower battery weight, wherein the cold plate is configured to support both the upper and lower battery weights.

In a second aspect, the present disclosure is directed to an aircraft including (a) a fuselage; (b) an airframe supporting the fuselage, wherein the airframe includes a pair of longitudinally-extending beams; and (c) the battery assembly of the first aspect, wherein the cold plate is secured to the pair of longitudinally-extending beams. In some embodiments, the pair of longitudinally-extending beams includes a pair of upper roof beams. In other embodiments, the pair of longitudinally-extending beams includes a pair of lower keel beams. In some embodiments, one of the upper or lower batteries is positioned within the fuselage, wherein the other of the upper or lower batteries is positioned outside the fuselage. In this regard, the aircraft may further include a lower fairing assembly, wherein the upper battery is positioned within the fuselage, wherein the lower battery is positioned outside the fuselage and within the lower fairing assembly. Alternatively, the aircraft may further include an upper cowling assembly, wherein the lower battery is positioned within the fuselage, wherein the upper battery is positioned outside the fuselage and within the upper cowling assembly.

In a third aspect, the present disclosure is directed to a cold plate including (a) a main structural web; (b) an upper enclosure panel spaced apart from the main structural web by an upper fluid channel configured to receive a cooling fluid, wherein the upper enclosure panel is configured to couple to an upper battery; and (c) a lower enclosure panel spaced apart from the main structural web by a lower fluid channel configured to receive the cooling fluid, wherein the lower enclosure panel is configured to couple to a lower battery. In some embodiments, the cold plate further includes (a) a plurality of upper stiffening members extending between the main structural web and the upper enclosure panel and spaced apart from each other to define respective upper fluid channel portions of the upper fluid channel; and (b) a plurality of lower stiffening members extending between the main structural web and the lower enclosure panel and spaced apart from each other to define respective lower fluid channel portions of the lower fluid channel. In this regard, each of the upper and lower stiffening members may include an aperture for providing fluid communication between adjacent fluid channel portions of the respective fluid channel.

In a fourth aspect, the present disclosure is directed to a method of cooling a plurality of batteries for powering an aircraft. The method includes (a) positioning an upper battery over a cold plate and a lower battery under the cold plate; and (b) directing a cooling fluid through at least one fluid channel of the cold plate between the upper and lower batteries. In some embodiments, the method further includes (a) after directing the cooling fluid through the at least one fluid channel, purging the cooling fluid from the at least one fluid channel; and (b) after purging the cooling fluid from the at least one fluid channel, performing a flight operation via the aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
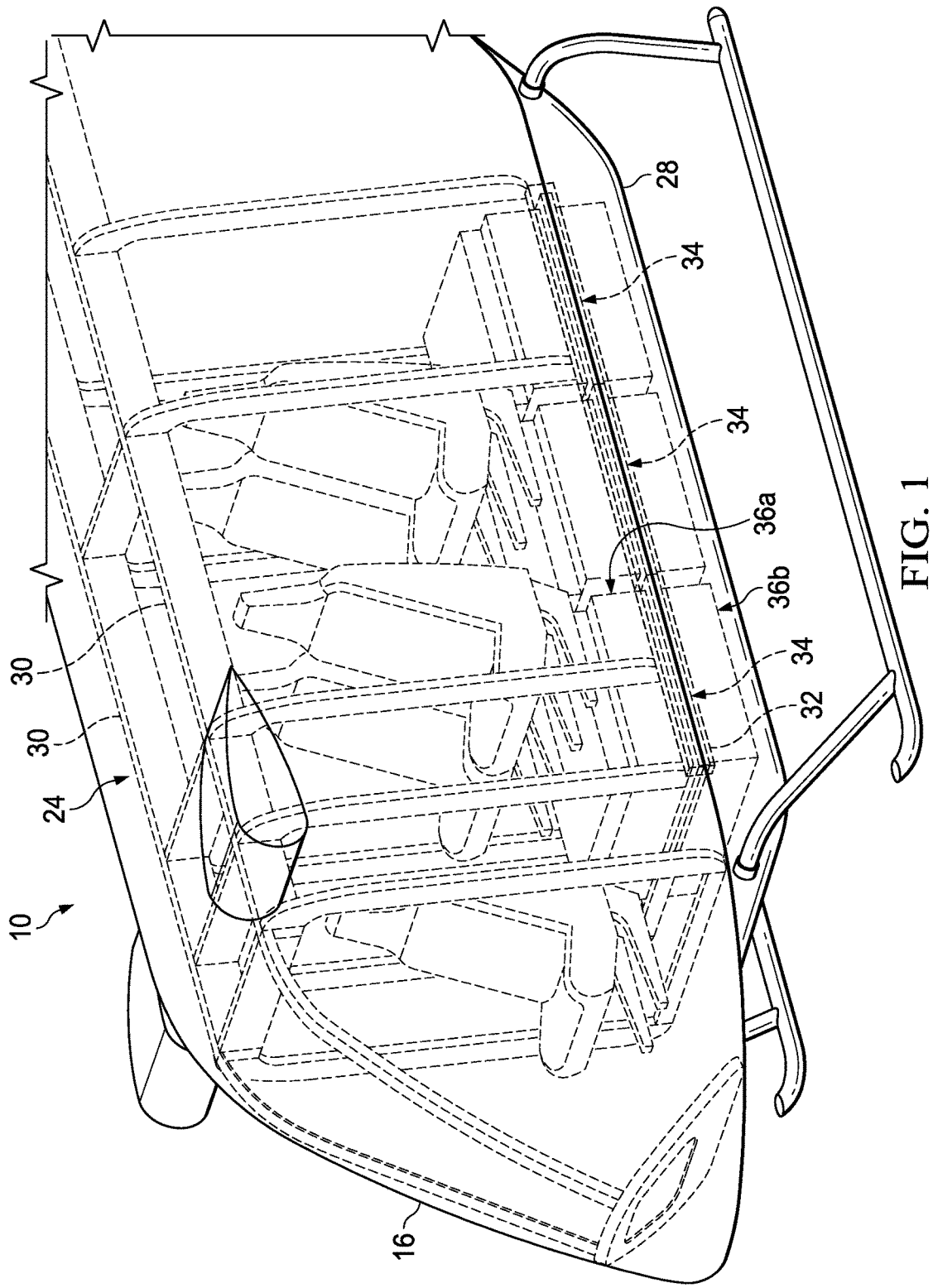
FIG. 1 is a perspective view of an exemplary rotorcraft having at least one double battery assembly secured to the lower keel beams of the helicopter.

Referring now to FIG. 1, an exemplary electric aircraft in the form of a rotorcraft (10) includes a rotor system with a plurality of rotor blades (not shown). The pitch of each rotor blade may be managed or adjusted to selectively control direction, thrust, and lift of rotorcraft (10). As shown, rotorcraft (10) includes a fuselage (16), and may further include a tail rotor or anti-torque system, an empennage, and/or a tail structure (not shown). Rotorcraft (10) also includes an airframe (24) which supports fuselage (16). While note shown, the tail structure may be used as a horizontal stabilizer. Torque may be supplied to the rotor system and anti-torque system using at least one motor. Rotorcraft (10) includes a variety of fairing and/or cowling assemblies (e.g., an upper cowling assembly and/or lower fairing assembly (28)) configured to cover or protect components of rotorcraft (10) and to reduce aerodynamic drag. Rotor system (12) is coupled to airframe (24) and, during operating, transmits vibrations to airframe (24).

Airframe (24) of the present version includes a pair of laterally-opposed, longitudinally-extending upper roof beams (30), a pair of laterally-opposed, longitudinally extending lower keel beams (32), and a plurality of double sided battery chasses in the form of dual cold plates (34) extending between and secured to lower keel beams (32). In some versions, cold plates (34) may also be secured to each other. In any event, each cold plate (34) supports an upper battery (36a) and a lower battery (36b) in a generally vertically stacked arrangement such that each cold plate (34) is sandwiched between the respective upper and lower batteries (36a, 36b), thereby collectively defining respective double battery assemblies (38). As shown, each upper battery (36a) is disposed above the floor of the passenger compartment of fuselage (16), and each lower battery (36b) is disposed below the floor of the passenger compartment of fuselage (16) within lower fairing assembly (28). Positioning lower batteries (36b) below the floor of the passenger compartment of fuselage (16) may increase the usable volume of the passenger cabin disposed inside of fuselage (16). Moreover, positioning upper and lower batteries (36a, 36b) on each cold plate (34) in a generally vertically stacked arrangement to form double battery assemblies (38) may effectively limit the horizontal footprint of each double battery assembly (38) to generally that of a single battery (36a, 36b). For example, the present version includes three double battery assemblies (38) collectively providing a total of six batteries (36a, 36b) arranged within a horizontal footprint generally defined by only three batteries (36a, 36b).

While three battery assemblies (38) are shown in the present version, it will be appreciated that any suitable number of battery assemblies (38) may be used to provide any desired number of batteries (36a, 36b). It will also be appreciated that each cold plate (34) may alternatively extend between and be secured to upper roof beams (30). In such cases, each upper battery (36a) may be disposed above the roof of the passenger compartment of fuselage (16) within an upper cowling assembly (not shown), and each lower battery (36b) may be disposed below the roof of the passenger compartment of fuselage (16).

Figure 2:
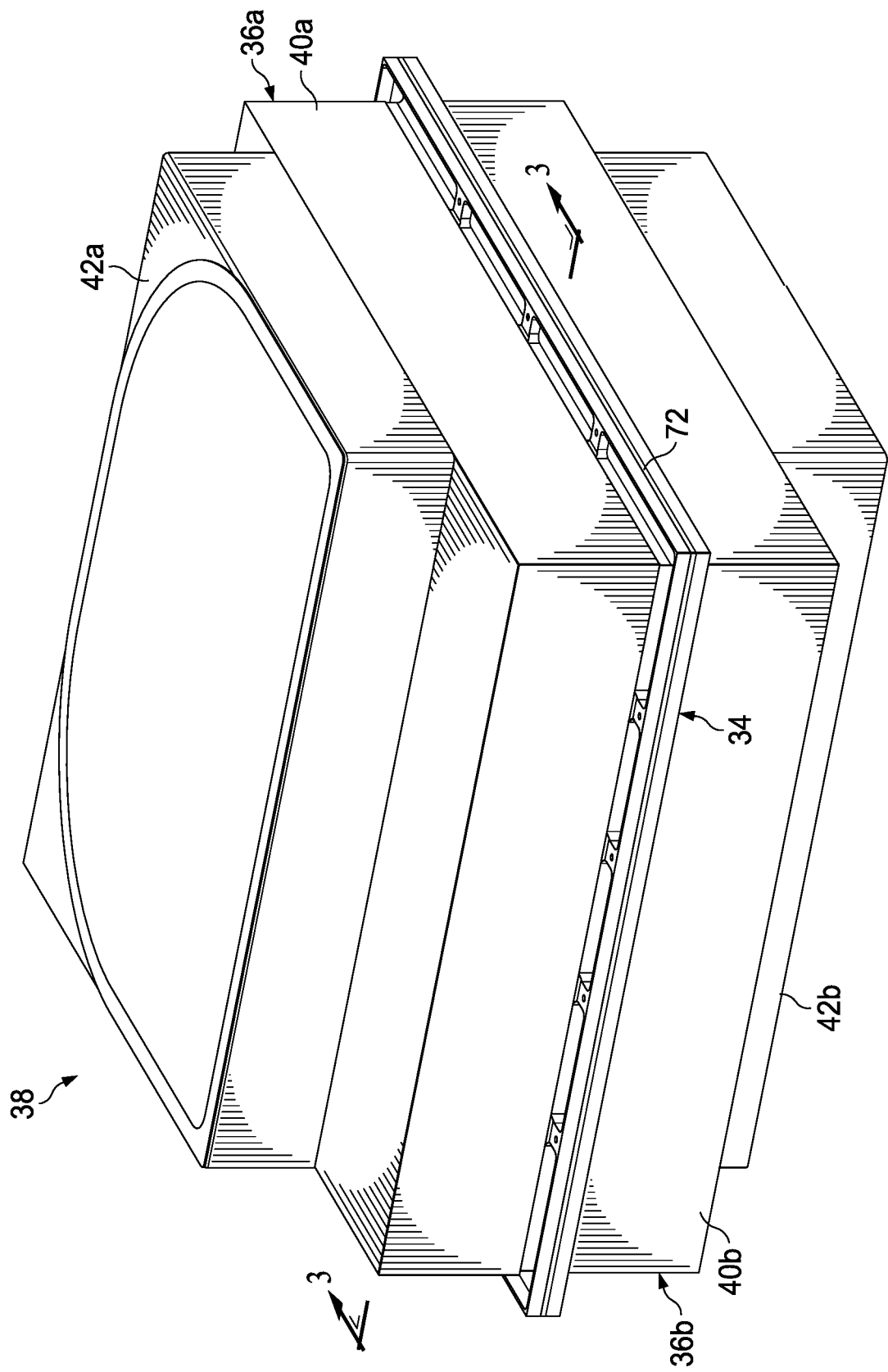
FIG. 2 is a perspective view of the double battery assembly of FIG. 1.

Referring now to FIG. 2, each battery (36a, 36b) includes a respective battery case (40a, 40b) for containing a plurality of battery cells (not shown). Batteries (36a, 36b) may be used as a primary power source for propelling rotorcraft (10). For example, batteries (36a, 36b) may include one or more of a traction battery, an electric-vehicle battery, a secondary cell battery, a Lithium-ion, Lithium polymer battery, and/or any subsets or combinations thereof. Other types of batteries or battery technologies are compatible with the present disclosure. In any event, each double battery assembly (38) of the present version further includes upper and lower battery management system housings (42a, 42b) secured to upper and lower batteries (36a, 36b), respectively, for containing monitoring equipment (not shown) for monitoring upper and lower batteries (36a, 36b), respectively. In some versions, such monitoring equipment may be integrated directly into the respective batteries (36a, 36b), such that battery management system housings (42a, 42b) may be omitted.

Figure 3:
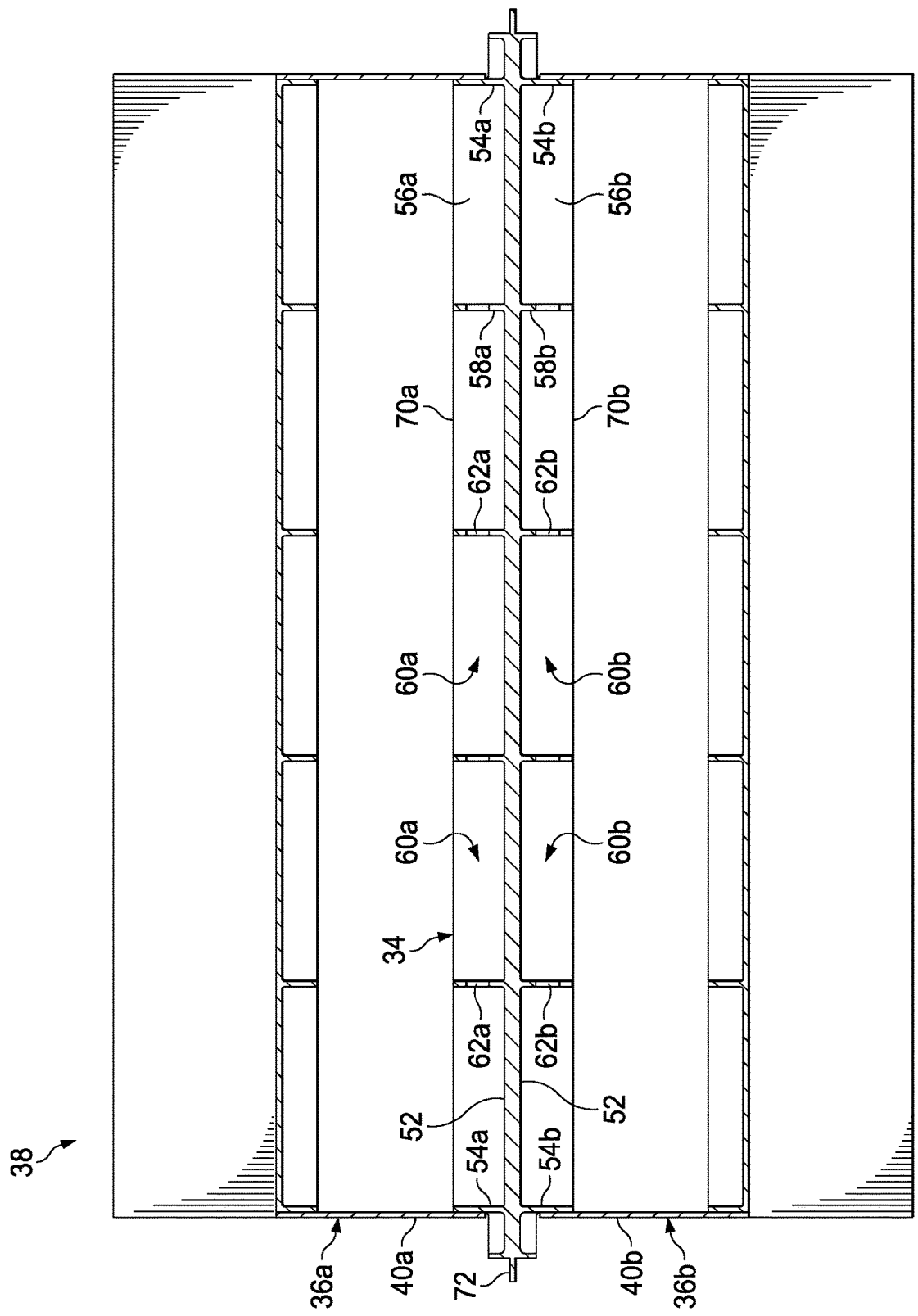
FIG. 3 is a cross-sectional view of the double battery assembly of FIG. 1, taken along section line 3-3 in FIG. 2.

Referring now to FIG. 3, cold plate (34) of each double battery assembly (38) includes a generally horizontal, rectangular main structural web (52), generally vertical upper and lower sidewalls (54a, 54b) extending upwardly and downwardly from upper and lower surfaces, respectively of main structural web (52), and generally vertical upper and lower end walls (56a, 56b) (one of each shown) extending upwardly and downwardly from upper and lower surfaces, respectively, of main structural web (52), such that sidewalls (54a, 54b) and end walls (56a, 56b) are each generally perpendicular to main structural web (52). As shown, cold plate (34) further includes a plurality of stiffeners in the form of generally vertical upper and lower ribs (58a, 58b) extending upwardly and downwardly from upper and lower surfaces, respectively, of main structural web (52) and positioned laterally inwardly of the respective sidewalls (54a, 54b) and longitudinally inwardly of the respective end walls (56a, 56b), such that upper and lower ribs (58a, 58b) are each generally perpendicular to main structural web (52). More particularly, upper and lower ribs (58a, 58b) are each generally parallel to the respective sidewalls (54a, 54b), and are generally perpendicular to and terminate at or near the respective end walls (56a, 56b). In some versions, main structural web (52), sidewalls (54a, 54b), end walls (56a, 56b), and ribs (58a, 58b) may be integrally formed together as a unitary piece. In addition or alternatively, any one or more of main structural web (52), sidewalls (54a, 54b), end walls (56a, 56b), and ribs (58a, 58b) may be constructed of a thermally conductive material, such as metal.

In the example shown, adjacent pairs of upper ribs (58a) are uniformly spaced apart from each other (and laterally outermost upper ribs (58a) are uniformly spaced apart from upper sidewalls (54a)) at equal intervals to define respective upper fluid channel portions (60a) therebetween. In some versions, upper ribs (58a) may each include a corresponding upper aperture (62a) such that adjacent upper fluid channel portions (60a) may be in fluid communication with each other to thereby collectively define a continuous upper fluid channel. For example, such upper apertures (62a) may be positioned near alternating ends of adjacent upper ribs (58a) so that the upper fluid channel may have a generally serpentine shape (e.g., when viewed from above). Similarly, adjacent pairs of lower ribs (58b) are uniformly spaced apart from each other (and laterally outermost lower ribs (58b) are uniformly spaced apart from lower sidewalls (54b)) at equal intervals to define respective lower fluid channel portions (60b) therebetween. In some versions, lower ribs (58b) may each include a corresponding lower aperture (62b) such that adjacent lower fluid channels portions (60b) may be in fluid communication with each other to thereby collectively define a continuous lower fluid channel. For example, such lower apertures (60b) may be positioned near alternating ends of adjacent lower ribs (58b) so that the lower fluid channel may have a generally serpentine shape (e.g., when viewed from below). Thus, upper and lower ribs (58a, 58b) may be configured to both provide structural rigidity to cold plate (34), and to direct a cooling fluid (e.g., coolant, forced air, etc.) along the respective upper and lower fluid channels. While the upper and lower fluid channels are each defined by corresponding ribs (58a, 58b) and sidewalls (54a, 54b) in the present version, cold plate (34) may alternatively include one or more upper and lower tubes (not shown) extending along the upper and lower surfaces, respectively, of main structural web (52) between ribs (58a, 58b) and/or sidewalls (54a, 54b). Such tubes may be fixed to the respective surfaces of main structural web (52) in any suitable manner, such as via swaging, and may define a respective fluid channel. Thus, such tubes may be configured to direct the cooling fluid along respective upper and lower fluid channels rather than ribs (58a, 58b). In any event, since cold plate (34) includes a pair of fluid channels on its upper and lower sides, cold plate (34) may be referred to as a "dual" cold plate (34).

In this regard, one of upper sidewalls (54a) or end walls (56a) may include an upper fluid inlet port for supplying the cooling fluid to the upper fluid channel from a cooling fluid reservoir (not shown), and another of upper sidewalls (54a) or end walls (56a) may include an upper fluid outlet port for discharging the cooling fluid from the upper fluid channel to the cooling fluid reservoir. For example, such upper fluid inlet and outlet ports may be positioned at opposite ends of the upper fluid channel. Similarly, one of lower sidewalls (54b) or end walls (56b) may include a lower fluid inlet port for supplying the cooling fluid to the lower fluid channel from the cooling fluid reservoir, and another of lower sidewalls (54b) or end walls (56b) may include a lower fluid outlet port for discharging the cooling fluid from the lower fluid channel to the cooling fluid reservoir. For example, such lower fluid inlet and outlet ports may be positioned at opposite ends of the lower fluid channel. In some versions, the upper fluid inlet and outlet ports may interconnect with the lower fluid inlet and outlet ports, respectively, such that the upper and lower channels may be in fluid communication with each other. Alternatively, the upper fluid inlet and outlet ports may be separate from the lower fluid inlet and outlet ports, respectively, such that the upper and lower channels may be fluidly isolated from each other.

In the example shown, cold plate (34) further includes generally horizontal upper and lower enclosure panels (70a, 70b) configured to couple to corresponding sidewalls (54a, 54b), end walls (56a, 56b), and ribs (58a, 58b), and to be spaced apart from main structural web (52) by the respective fluid channel. In this manner, enclosure panels (70a, 70b) may inhibit cooling fluid from inadvertently escaping from the fluid channels. It will be appreciated that enclosure panels (70a, 70b) may be either fixedly or removably coupled to the corresponding sidewalls (54a, 54b), end walls (56a, 56b), and/or ribs (58a, 58b). In some versions, enclosure panels (70a, 70b) may each be constructed of a thermally conductive material, such as metal.

In the present version, sidewalls (54a, 54b) are each spaced laterally inwardly of the outer periphery of main structural web (52) and end walls (56a, 56b) are each spaced longitudinally inwardly of the outer periphery of main structural web (52) by a generally constant distance to define a peripheral attachment flange (72). Cold plate (34) may be secured to lower keel beams (32) (or upper roof beams (30)) via a plurality of aerospace fasteners such as pins, screws, rivets or other suitable fastening means extending through attachment flange (72) and into lower keel beams (32) (or upper roof beams (30)) to form airframe (24), such that cold plate (34) may act as a load path for airframe (24). In some versions, cold plates (34) of adjacent double battery assemblies (38) may be secured to each other via the respective attachment flanges (72) in a similar manner.

With continuing reference to FIG. 3, upper and lower batteries (36a, 36b) are mounted to upper and lower enclosure panels (70a, 70b) of cold plate (34), respectively to form double battery assembly (38). More particularly, upper battery (36a) is mounted to upper enclosure panel (70a) such that upper battery (36a) is positioned over cold plate (34) and lower battery (36b) is mounted to lower enclosure panel (70b) such that lower battery (36b) is positioned under cold plate (34). Batteries (36a, 36b) may each be mounted to the respective enclosure panel (70a, 70b) via aerospace fasteners such as pins, screws, rivets or other suitable fastening means extending through the corresponding battery case (40a, 40b) and into the respective enclosure panel (70a, 70b). In addition or alternatively, batteries (36a, 36b) may each be mounted to the respective enclosure panel (70a, 70b) via a clamping mechanism (e.g., a C-clamp) configured to clamp each battery case (40a, 40b) against the respective enclosure panel (70a, 70b). In some versions, batteries (36a, 36b) may each be mounted to the respective enclosure panel (70a, 70b) via the respective sidewalls (54a, 54b). In any event, an outer surface of each battery (36a, 36b) (and/or of each battery cell or pack contained therein) may be in contact or near contact with the respective enclosure panel (70a, 70b), to assist with transferring heat from each battery (36a, 36b) to the cooling fluid within the respective cooling channel, such as for cooling batteries (36a, 36b) either during or prior to (e.g., "preconditioning" batteries (36a, 36b)) performing a flight operation. Thus, dual cold plate (34) may provide independent fluid channels for cooling each battery (36a, 36b).

By providing double battery assembly (38) with upper and lower batteries (36a, 36b) vertically stacked with battery cold plate (34) sandwiched therebetween, the horizontal footprint of both batteries (36a, 36b) may be contained within the horizontal footprint of a single battery (36a, 36b), thereby reducing the amount of horizontal space required on rotorcraft (10) to accommodate both batteries (36a, 36b). Moreover, by utilizing cold plate (34) as a battery chassis and securing cold plate (34) to lower keel beams (32) (or upper roof beams (30)), cold plate (34) may both support the weight of and remove heat from batteries (36a, 36b), thereby eliminating the need for separate supporting structures and cooling systems and thus reducing the weight of rotorcraft (10), at least by comparison to a similar rotorcraft having such separate supporting structures and cooling systems. Positioning only upper batteries (36a) within fuselage (16) with lower batteries (36b) positioned below the floor of the passenger compartment of fuselage (16) (or, conversely, only lower batteries (36b) within fuselage (16) with upper batteries (36a) positioned above the roof of the passenger compartment of fuselage (16)) may allow the passenger compartment to remain relatively available for passengers and/or cargo. Such positioning of batteries (36a, 36b) may also allow batteries (36a, 36b) to be readily accessible for removal, installation, and/or maintenance of batteries (36a, 36b).

Figure 4:
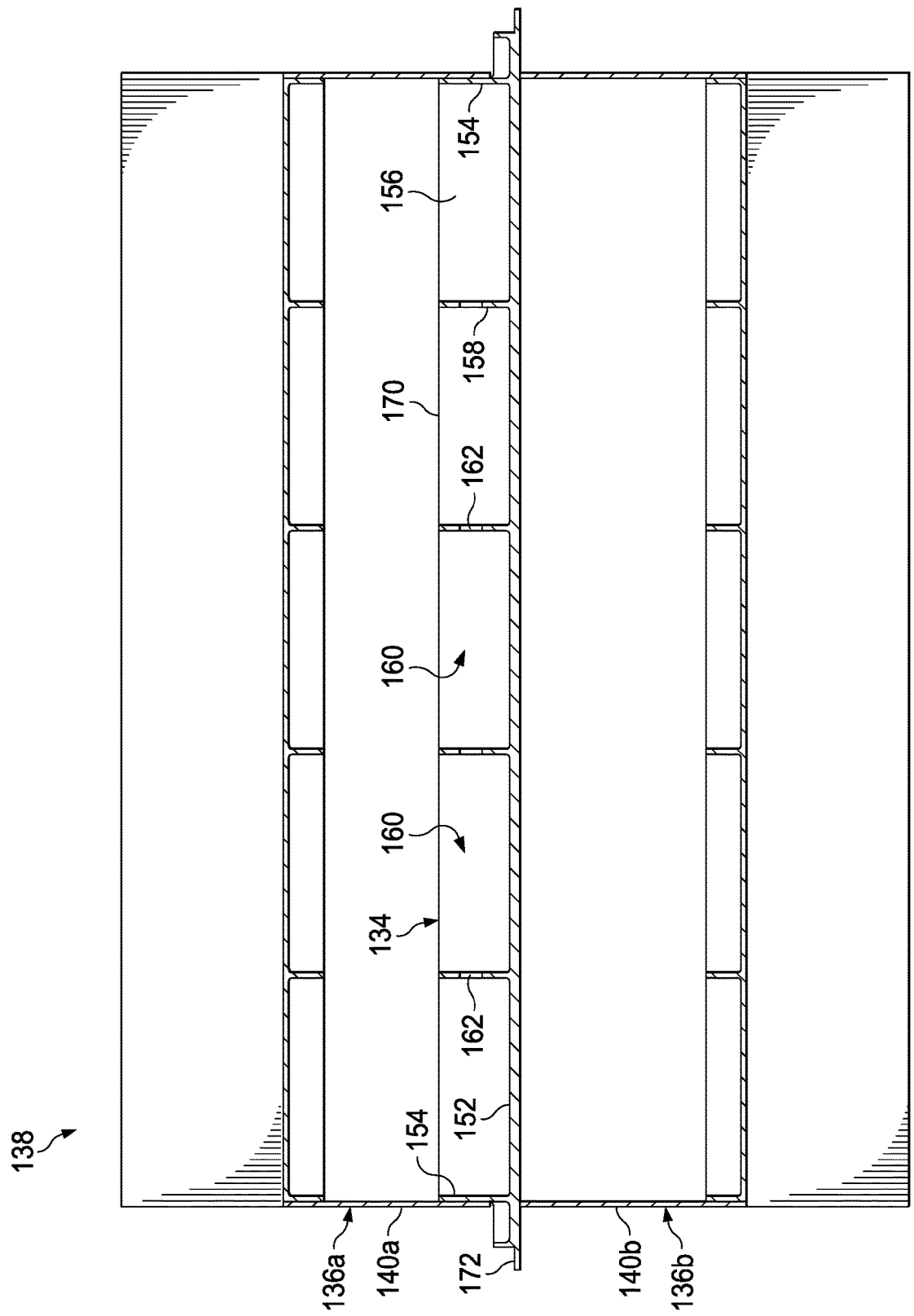
FIG. 4 is a cross-sectional view of another exemplary double battery assembly.

Referring now to FIG. 4, an alternative battery chassis in the form of a singular cold plate (134) supports an upper battery (136a) and a lower battery (136b) in a generally vertically stacked arrangement such that cold plate (134) is sandwiched between upper and lower batteries (136a, 136b), thereby collectively defining an alternative double battery assembly (138) similar to double battery assembly (38) except as otherwise described herein. Cold plate (134) of double battery assembly (138) includes a generally horizontal, rectangular main structural web (152), generally vertical sidewalls (154) extending upwardly from an upper surface of main structural web (152), and generally vertical end walls (156) (one shown) extending upwardly from the upper surface of main structural web (152), such that sidewalls (154) and end walls (156) are each generally perpendicular to main structural web (152). As shown, cold plate (134) further includes a plurality of stiffeners in the form of generally vertical ribs (158) extending upwardly from the upper surface of main structural web (152) and positioned laterally inwardly of sidewalls (154) and longitudinally inwardly of end walls (156), such that ribs (158) are each generally perpendicular to main structural web (152). More particularly, ribs (158) are each generally parallel to sidewalls (154), and are generally perpendicular to and terminate at or near end walls (156). In some versions, main structural web (152), sidewalls (154), end walls (156), and ribs (158) may be integrally formed together as a unitary piece. In addition or alternatively, any one or more of main structural web (152), sidewalls (154), end walls (156), and ribs (158) may be constructed of a thermally conductive material, such as metal.

In the example shown, adjacent ribs (158) are uniformly spaced apart from each other (and laterally outermost ribs (158) are uniformly spaced apart from sidewalls (154)) at equal intervals to define respective fluid channel portions (160) therebetween. In some versions, ribs (158) may each include a corresponding aperture (162) such that adjacent fluid channel portions (160) may be in fluid communication with each other to thereby collectively define a continuous fluid channel. For example, such apertures (162) may be positioned near alternating ends of adjacent ribs (158) so that the fluid channel may have a generally serpentine shape (e.g., when viewed from above). Thus, ribs (158) may be configured to both provide structural rigidity to cold plate (134), and to direct a cooling fluid (e.g., coolant, forced air, etc.) along the fluid channel. While the fluid channel is defined by ribs (158) and sidewalls (154) in the present version, cold plate (134) may alternatively include one or more tubes (not shown) extending along the upper surface of main structural web (152) between ribs (158) and/or sidewalls (154). Such tubes may be fixed to the upper surface of main structural web (152) in any suitable manner, such as via swaging, and may define a fluid channel. Thus, such tubes may be configured to direct the cooling fluid along the fluid channel rather than ribs (158). In any event, since cold plate (134) includes a single fluid channel on its upper side, cold plate (134) may be referred to as a "singular" cold plate (134).

In this regard, one of sidewalls (154) or end walls (156) may include a fluid inlet port for supplying the cooling fluid to the fluid channel from a cooling fluid reservoir (not shown), and another of sidewalls (154) or end walls (156) may include a fluid outlet port for discharging the cooling fluid from the fluid channel to the cooling fluid reservoir. For example, such fluid inlet and outlet ports may be positioned at opposite ends of the fluid channel.

In the example shown, cold plate (134) further includes a generally horizontal enclosure panel (170) configured to couple to sidewalls (154), end walls (156), and ribs (158), and to be spaced apart from main structural web (152) by the fluid channel. In this manner, enclosure panel (170) may inhibit cooling fluid from inadvertently escaping from the fluid channel. It will be appreciated that enclosure panel (170) may be either fixedly or removably coupled to the sidewalls (154), end walls (156), and/or ribs (158). In some versions, enclosure panel (170) may be constructed of a thermally conductive material, such as metal.

In the present version, sidewalls (154) are each spaced laterally inwardly of the outer periphery of main structural web (152) and end walls (156) are each spaced longitudinally inwardly of the outer periphery of main structural web (152) by a generally constant distance to define a peripheral attachment flange (172). Cold plate (134) may be secured to lower keel beams (32) (or upper roof beams (30)) via a plurality of aerospace fasteners such as pins, screws, rivets or other suitable fastening means extending through attachment flange (172) and into lower keel beams (32) (or upper roof beams (30)) to form airframe (24), such that cold plate (134) may act as a load path for airframe (24).

With continuing reference to FIG. 4, upper and lower batteries (136a, 136b) are mounted to enclosure panel (170) and main structural web (152) of cold plate (134), respectively to form double battery assembly (138). More particularly, upper battery (136a) is mounted to enclosure panel (170) such that upper battery (136a) is positioned over cold plate (134) and lower battery (136b) is mounted to main structural web (152) such that lower battery (136b) is positioned under cold plate (134). Batteries (136a, 136b) may be mounted to enclosure panel (170) and main structural web (152), respectively, via aerospace fasteners such as pins, screws, rivets or other suitable fastening means extending through a corresponding battery case (140a, 140b) of each battery (136a, 136b) and into enclosure panel (170) and main structural web (152), respectively. In addition or alternatively, batteries (136a, 136b) may be mounted to enclosure panel (170) and main structural web (152), respectively, via a clamping mechanism (e.g., a C-clamp) configured to clamp each battery case (140a, 140b) against enclosure panel (170) and main structural web (152), respectively. In any event, an outer surface of each battery (36a, 36b) may be in contact or near contact with enclosure panel (170) and main structural web (152), respectively, to assist with transferring heat from each battery (136a, 136b) to the cooling fluid within the cooling channel, such as for cooling batteries (136a, 136b) either during or prior to (e.g., "preconditioning" batteries (136a, 136b)) performing a flight operation. Thus, singular cold plate (134) may provide a common fluid channel for cooling both batteries (136a, 136b), which provide a weight reduction as compared to dual cold plate (34), for example. In some versions, a second singular cold plate (134) may be stacked between cold plate (134) and either battery (136a, 136b) to provide independent fluid channels for cooling each battery (136a, 136b).

Figure 5:
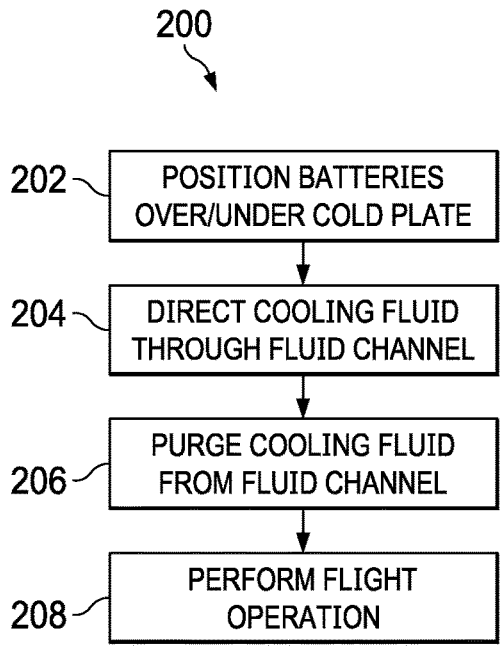
FIG. 5 is a flowchart of an exemplary method of cooling batteries on an aircraft.

Referring now to FIG. 5, a method (200) of cooling an electrical power source, such as any of batteries (36a, 36b, 136a, 136b), of a rotorcraft (10) begins with step (202), at which upper and lower batteries (36a, 36b, 136a, 136b) are positioned over and under a cold plate, such as any of cold plates (34, 134), respectively, to thereby sandwich cold plate (34, 134) therebetween. Method (200) proceeds to step (204), at which a cooling fluid (e.g., coolant, forced air, etc.) is directed through at least one fluid channel of cold plate (34, 134) between upper and lower batteries (36a, 36b, 136a, 136b) to thereby transfer heat from batteries (36a, 36b, 136a, 136b) to the cooling fluid. In the illustrated version, method (200) then proceeds to step (206), at which the cooling fluid is purged from the at least one fluid channel of cold plate (34, 134), and further proceeds to step (208), at which a flight operation is performed while the at least one fluid channel of cold plate (34, 134) is empty (e.g., with the cooling fluid purged therefrom). In other versions, step (206) may be omitted, such that at step (208) a flight operation is performed while the cooling fluid remains within the at least one fluid channel of cold plate (34, 134).

Figure 6:
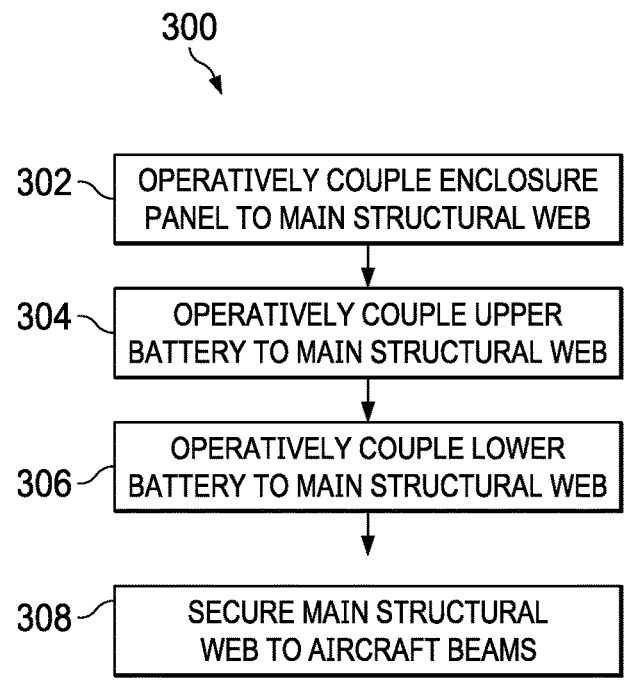
FIG. 6 is a flowchart of an exemplary method of manufacturing a double battery assembly.

Referring now to FIG. 6, a method (300) of manufacturing a double sided battery assembly, such as any of battery assemblies (38, 138), begins with step (302), at which at least one enclosure panel, such as any of enclosure panels (70a, 70b, 170) is operatively coupled to a main structural web, such as any of main structural webs (52, 152) (e.g., via any of sidewalls (54a, 54b, 154), end walls (56a, 56b, 156), and ribs (58a, 58b, 158)), and spaced apart therefrom by at least one fluid channel. Method (300) proceeds to step (304), at which an upper battery, such as any of upper batteries (36a, 136a), is operatively coupled to main structural web (52, 152) (e.g., either directly or via the at least one enclosure panel (70a, 170)) above the at least one fluid channel. Method (300) then proceeds to step (306), at which a lower battery, such as any of lower batteries (36b, 136b), is operatively coupled to main structural web (52, 152) (e.g., either directly or via the at least one enclosure panel (70b)) below the at least one fluid channel. In some versions, step (306) may be performed during or prior to step (304). In the illustrated version, method (300) proceeds to step (308), at which main structural web (52, 152) is secured to a pair of beams of rotorcraft (10), such as upper roof beams (30) or lower keel beams (32). In some versions, step (308) may be performed during or prior to any of steps (302, 304, 306).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A battery assembly for an aircraft, comprising:
   (a) a cold plate including:
      (i) an upper planar member,
      (ii) a lower planar member,
      (iii) at least one fluid channel positioned between the upper and lower planar members and configured to receive a cooling fluid, and
      (iv) at least one sidewall generally perpendicular to the upper planar member and the lower planar member and comprising at least one border to the at least one fluid channel;
      wherein one of the upper or lower planar members includes a main structural web, the main structural web comprising a peripheral attachment flange located longitudinally outward from the at least one sidewall and extending along the entire periphery of the battery assembly;
   (b) an upper battery mounted to the upper planar member for transferring heat from the upper battery to the cooling fluid through the upper planar member; and
   (c) a lower battery mounted to the lower planar member for transferring heat from the lower battery to the cooling fluid through the lower planar member.

2. The battery assembly of claim 1, wherein the peripheral attachment flange is configured to be coupled to an airframe of the aircraft such that the cold plate comprises a load path for the airframe.

3. The battery assembly of claim 1, wherein the cold plate further includes a main structural web, wherein the upper and lower planar members include upper and lower enclosure panels operatively coupled to the main structural web.

4. The battery assembly of claim 3, wherein the at least one fluid channel includes an upper fluid channel positioned between the main structural web and the upper enclosure panel, and a lower fluid channel positioned between the main structural web and the lower enclosure panel.

5. The battery assembly of claim 4, wherein the upper and lower fluid channels are fluidly isolated from each other.

6. The battery assembly of claim 1, wherein the cold plate further includes a plurality of stiffeners extending between the upper and lower planar members, wherein the plurality of stiffeners are spaced apart from each other to define respective fluid channel portions of the at least one fluid channel.

7. The battery assembly of claim 6, wherein each of the stiffeners includes an aperture for providing fluid communication between adjacent fluid channel portions of the at least one fluid channel.

8. The battery assembly of claim 1, wherein the peripheral attachment flange is configured to couple to a pair of beams of the aircraft.

9. The battery assembly of claim 1, wherein the upper battery has an upper battery weight, wherein the lower battery has a lower battery weight, wherein the cold plate is configured to support both the upper and lower battery weights.

10. A cold plate, comprising:
(a) a main structural web, the main structural web comprising a peripheral attachment flange extending along the entire periphery of the cold plate;
(b) an upper enclosure panel spaced apart from the main structural web by an upper fluid channel configured to receive a cooling fluid, wherein the upper enclosure panel is configured to couple to an upper battery;
(c) a lower enclosure panel spaced apart from the main structural web by a lower fluid channel configured to receive the cooling fluid, wherein the lower enclosure panel is configured to couple to a lower battery; and
(d) at least one sidewall generally perpendicular to the upper enclosure panel and the lower enclosure panel and configured to comprise at least one lateral border to the upper fluid channel and the lower fluid channel, the at least one sidewall located longitudinally inward of the peripheral attachment flange.

11. The cold plate of claim 10, further comprising:
(a) a plurality of upper stiffening members extending between the main structural web and the upper enclosure panel and spaced apart from each other to define respective upper fluid channel portions of the upper fluid channel; and
(b) a plurality of lower stiffening members extending between the main structural web and the lower enclosure panel and spaced apart from each other to define respective lower fluid channel portions of the lower fluid channel.

12. The cold plate of claim 11, wherein each of the upper and lower stiffening members includes an aperture for providing fluid communication between adjacent fluid channel portions of the respective fluid channel.

* * * * *